(No Model.)

E. THOMSON.
SAFETY DEVICE FOR ELECTRICAL CIRCUITS.

No. 327,039. Patented Sept. 29, 1885.

Witnesses.
Henry March.
Arthur Zipperlen.

Inventor.
Elihu Thomson.
by Crosby Gregory
attys.

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

SAFETY DEVICE FOR ELECTRICAL CIRCUITS.

SPECIFICATION forming part of Letters Patent No. 327,039, dated September 29, 1885.

Application filed February 8, 1884. (No model.)

*To all whom it may concern:*

Be it known that I, ELIHU THOMSON, of Lynn, county of Essex, State of Massachusetts, have invented an Improvement in Safety Devices for Electrical Circuits, of which the following description, in connection with the accompanying drawings, is a specification, like letters on the drawings representing like parts.

My invention relates to a safety device for circuits that derive electrical energy or are fed from other circuits supplied with currents of higher potential than is desirable for the supplied or local circuits, in which the current may be produced by induction from the main or supplying circuit, or by some other transferring apparatus which may operate continuously or intermittently.

The safety device consists, essentially, of a switch or circuit connecting device (shown in this instance as controlled by an electro-magnet) having one terminal connected with the local or supplied circuit and the other with the ground, in such a manner that when the said local circuit becomes accidentally or unintentionally connected with the main or supplying circuit the said magnet will be energized by the electricity escaping to the ground, and when thus energized will cause or permit the switch to be opened, wholly disconnecting the local or supplied circuit from the main circuit.

Figure 1:
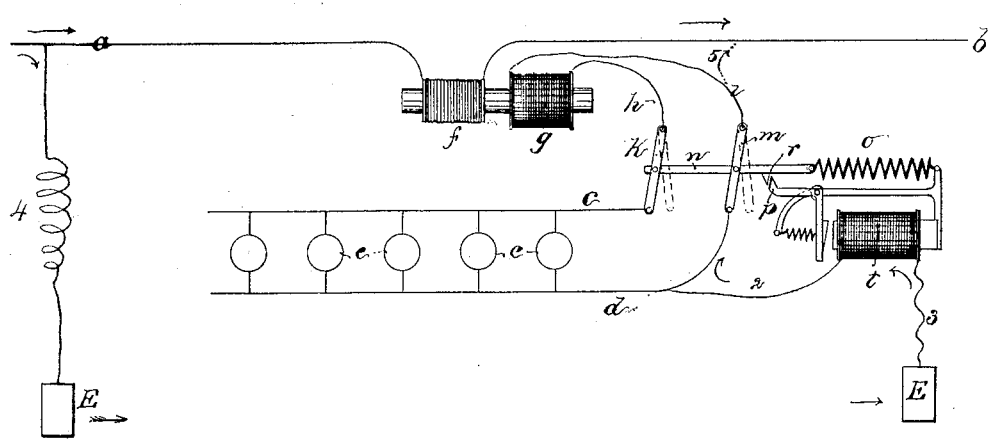
Figure 2:
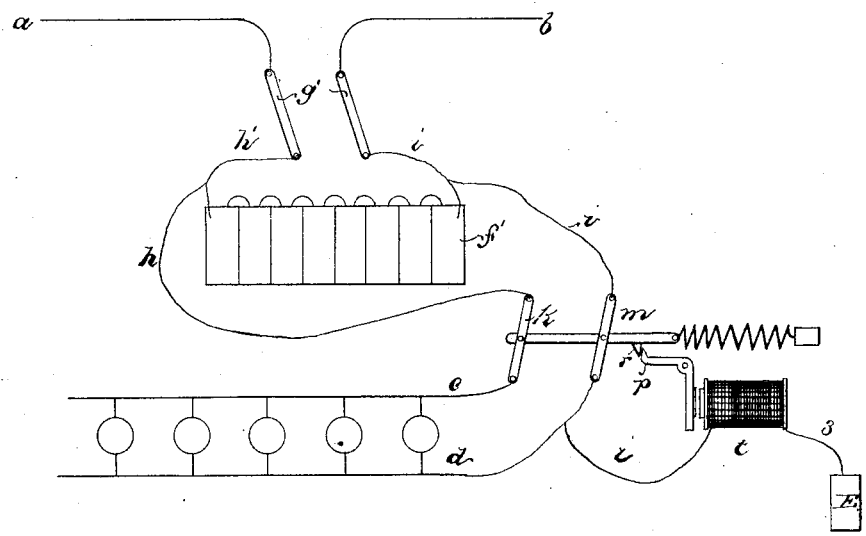

Figure 1 is a diagram of a main current-supplying circuit and supplied or local circuit which derives electrical energy from the said main circuit, and is provided with a safety device in accordance with this invention; and Fig. 2 a similar diagram, showing the local circuit supplied with electrical energy from the main circuit through the intervention of a secondary battery which is charged from the main line and then gives out electricity to the local circuit.

The main line $a\,b$, charged with an electric current of high potential from any suitable generator or source of electricity, is provided with means to impart electrical energy to or cause an electric current to be produced in a local or current-receiving circuit, $c\,d$, for supplying instruments of any kind—such, for instance, as incandescent lamps, (indicated at $e$.)

The apparatus by which electricity is imparted or supplied to the local circuits $c\,d$ from the main circuit $a\,b$ is shown in Fig. 1 as consisting of an induction-coil, $f\,g$, the terminals of the secondary coil of which are connected by wires $h\,i$ with switches $k\,m$, or other circuit-controlling devices, which may be placed in contact with the terminals of the local circuit $c\,d$, thus completing the said local circuit through the said secondary coil $g$, or by means of the said switches the said local circuit may be wholly disconnected from the said secondary coil, and thus be wholly removed from the influence of the main circuit $a\,b$. This kind of apparatus may be used for imparting electricity to a local or supplied circuit from a main circuit in which the currents are of short duration or of alternating polarity.

The switches $k\,m$ are mechanically connected together by a bar, $n$, by which they may be both moved simultaneously to connect both terminals of the circuit $c\,d$ with the coil $g$ or to disconnect them therefrom, the said bar being acted upon by a spring, $o$, tending to move it in a direction to disconnect the said local circuit and coil.

When the switches are moved to the position to connect the local circuits $c\,d$ and coil $g$, as shown in full lines, Fig. 1, they are retained in the said position by a locking device shown as a finger, $p$, engaging a projection, $r$, on the bar $n$, the said finger being connected with the armature-lever of an electro-magnet, $t$, one terminal of which is connected by wire 2 with the local circuit, and the other terminal of which is connected by wire 3 with the ground.

When the circuit $c\,d$ is charged with a current of normal potential and the insulation from the main line is nearly perfect, the current escaping from the circuit $c\,d$ through the magnet $t$ to the ground is wholly inappreciable, or insufficient to cause the said magnet to attract its armature, and the circuit cut-off or safety device, consisting of the said magnet and switches $h\,m$, produces no material effect. If, however, the local circuit $c\,d$ should become overcharged by an escape from the main circuit *a b*—such as might be produced by a cross-connection between the said circuits or an imperfection in the insulation between the main and secondary coils of the transferring apparatus—the current from the main circuit will increase the potential in the local circuit, so that the electricity escaping from the latter through the magnet *t* would be sufficient to energize the said magnet, so that it would attract its armature and release the bar *n*, which is moved to the position shown in dotted lines, Fig. 1, wholly disconnecting the circuit *c d* from the main or supplying circuit, and removing the possibility of injury to the said local circuit *c d* and instruments connected therewith, arising from too strong a current.

When the main circuit *a b* is short and thoroughly insulated, it should have a ground-connection, as shown at 4, through a large resistance, in order to afford a circuit for the magnet *t*, in case the main and local lines become connected; but when the main line is long the general unavoidable leakage will be sufficient without a special earth-connection.

When the main and local circuits are connected, as shown by the dotted line 5, the current will divide at the points 4 and 5, as indicated by the arrows, a part flowing through the earth-branch 4 3 2 5, including the magnet *t* and a part of the local circuit, and thus energizing the said magnet and causing the total separation of the local from the main circuit.

The invention is applicable in any case where one electric circuit, which may for distinction be called the "local" or "supplied" circuit, derives its electricity in any way from another circuit containing a prime generating source of electricity, it being intended that the two circuits should be electrically disconnected or insulated from one another, and that the current in the supplied circuit shall be normally of lower potential than that in the main circuit.

The means or apparatus employed for imparting the electricity to the local from the main circuit may be varied, and it is not essential that the local circuit be continuously supplied while a current is flowing through the main circuit. The essential feature of the invention consists in providing an automatic cut-off for separating a circuit from one having a current of higher potential when connection has been established between said circuits.

Fig. 2 illustrates two circuits, one of which, *a b*, may be considered the main circuit, and is intended to have currents of high potential, and the other or local circuit, *c d*, is intended to be supplied with electrical energy derived from the current in the main circuit *a b*. Instead, however, of deriving its electricity continuously by induction, as previously described in connection with Fig. 1, it receives it intermittingly by means of an intermediate storing device, consisting in this instance of a secondary battery, *f*, so arranged that it may be placed in connection with the main circuit to receive electricity therefrom, and then with the local circuit to impart the electricity supplied from the main circuit to the said local circuit. The said battery is connected by wires *h' i'* with switches *g'*, which may be connected with the main line in order that the battery might receive its supply therefrom, and the coils of the said battery are also connected by wires *h i* with switches *k m*, by which it may be connected with the local circuit in order to impart the supply of electricity from the main circuit to the said local circuit.

Since, owing to the proximity of portions of the local circuit to the main circuit, and owing to the connections between the local circuit and the battery and between the battery and the main circuit, it is possible that the local circuit might become connected with the main circuit, in which case it would be charged with electricity of as high potential as that in the main circuit, the said local circuit is provided with an automatic cut-off or safety device, *k m t*, which forms, in connection with the main and local circuits, the subject of this invention, and the construction and operation of which has already been fully described in connection with Fig. 1, in which other means were employed for imparting the electrical energy from the main to the local circuit.

The normal operation of the apparatus illustrated in Fig. 2 is as follows: When the switches *g'* are in position to connect the main circuit *a b* with the wires *h' i'*, the current from the said main circuit will flow over the earth-branch 3 sufficiently to cause the magnet *t* to be energized by the escape, permitting the switches *k m* to open, as before, and the local circuit *c d* will thus be disconnected from the main circuit while the secondary battery is being charged. When the latter is sufficiently charged, the switches *g'* may be opened and the switches *k m* closed and engaged by the locking device, thus enabling the local circuit to be supplied from the battery *f'*, although if any accidental connection should occur between the main and local circuits the switches *k m* will be permitted to open, removing the local circuit from the influence of the main circuit.

I claim—

1. A main or current-supplying electric circuit and a local or supplied circuit deriving electrical energy therefrom, but intended to be electrically insulated or disconnected from said main circuit, and normally having a current of lower potential than said main circuit, combined with a safety cut-off operated by increase in potential of the current in the local or supplied circuit, whereby the latter is automatically disconnected from the main circuit upon the establishment of electrical connection between said main and supplied circuits, substantially as described.

2. A main or current-supply electric circuit and a local or supplied circuit deriving electrical energy therefrom, but intended to be electrically insulated or disconnected from the said main circuit, and to normally have a current of lower potential than the said main circuit, combined with switches controlling the local circuit, and a controlling electro-magnet for the said switches, and a branch circuit from the local circuit to the ground, including the said magnet, which, upon connection being made between the main and local circuits, and the consequent rise in potential in the latter, is energized and causes the switches to be operated and the local circuit thereby disconnected from the main circuit, substantially as described.

3. The main and local circuits and apparatus which supplies or imparts electricity to the latter from the former, combined with switches controlling the connection of the said local circuit with the transferring apparatus, the locking device for the said switches, and the electro-magnet and its armature controlling the said locking device, the said magnet being energized upon the abnormal rise of potential in the supplied circuit, such as produced by an electrical connection between the supplied and main circuits, and thus operating the locking device and causing the switch to disconnect the supplied from the main circuit, substantially as described.

In testimony whereof I have signed my name to this specification in the presence of two subscribing witnesses.

ELIHU THOMSON.

Witnesses:
W. O. WAKEFIELD,
E. WILBUR RICE.